Lautenschlager & Gott.
Tobacco Pipe.
No 2859 Reissued Feb. 11, 1868.
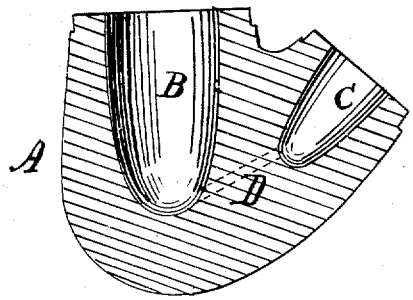
Witnesses.
Jas. H. Layman.
J. E. W. Bowen
Inventors.
G. Lautenschlager
G. L. Gott
By Knight Bros
Attys

UNITED STATES PATENT OFFICE.

GUSTAV LAUTENSCHLAGER, OF CINCINNATI, OHIO, AND GEORGE L. GOTT, OF NEW YORK, N. Y.

TOBACCO-PIPE.

Specification forming part of Letters Patent No. 52,297, dated January 30, 1866; antedated January 17, 1866; Reissue No. 2,859, dated February 11, 1868.

*To all whom it may concern:*

Be it known that we, GUSTAV LAUTENSCHLAGER, lately of the city, county, and State of New York, but now of Cincinnati, Hamilton county, Ohio, and GEORGE L. GOTT, of the said city of New York, have invented a new and useful Tobacco-Pipe; and we do hereby declare the following to be a full, clear, and exact description thereof, reference being had to the accompanying drawing, making part of this specification, and in which a pipe-bowl embodying our invention is represented by a vertical section.

It is a well-known fact that coal of any description, be it animal, vegetable, or mineral, is a superior deodorizing and absorbing agent. Based on this fact is the present invention, which consists in forming an entire pipe-bowl or any specific part of it, such as a nicotine or saliva receptacle, of coal-dust combined with pitch, rosin, or any suitable cement, and then pressed or formed in suitable molds, and finally baked apart from atmospheric contact.

Our preferred mode of manufacture is to take, in finely-pulverized form, and mix thoroughly, of wood-charcoal, two measures; of asphaltum or mineral pitch, one measure, and compress the same in a suitable mold until it assumes the form shown at A. The pipe thus formed is then embedded in pulverized chalk, fine sand, or other non-combustible powder within a tight box or muffle, pierced for the escape of gas, which muffle is then placed in an oven and subjected to a sufficient temperature to expel all the gaseous emanations of the composition through the orifices of the muffle, which having been effected the oven is tightly closed, left to a white heat, and suffered to gradually cool.

For obvious economical reasons a large number of bowls should be treated simultaneously.

A pipe-bowl of this kind absorbs all of the narcotic oil of the tobacco and the saliva accumulating in the same, so that the smoke which reaches the mouth of the user is dry and healthy.

If desired, a nicotine-reservoir composed as above may be combined with a bowl proper of any other description; but we prefer to make the entire bowl of our composition, as already stated.

In the accompanying illustration, A is the body of the bowl; B, the tobacco-chamber; C, socket for pipe-stem. The dotted lines D indicate the place of a passage between B and C, made after molding by means of a suitable drill or other instrument.

We claim as new and of our invention—

A bowl or a nicotine-receptacle of a tobacco-pipe made of coal-dust mixed with pitch or other suitable cement, and formed substantially as and for the purposes described.

In testimony of which invention we hereunto set our hands.

GUSTAV LAUTENSCHLAGER.
GEORGE L. GOTT.

Witnesses as to Lautenschlager:
GEO. H. KNIGHT,
JAMES H. LAYMAN.

Witnesses as to Gott:
F. VOLK,
J. HENNY.